Patented Feb. 6, 1940

2,189,735

UNITED STATES PATENT OFFICE 2,189,735

RESIN BONDED ABRASIVE ARTICLE

Samuel S. Kistler, West Boylston, and Carl E. Barnes, Worcester, Mass., assignors to Norton Company, Worcester, Mass., a corporation of Massachusetts

REISSUED
MAR 4 - 1941

No Drawing. Application January 28, 1938, Serial No. 187,552. Renewed October 31, 1939

6 Claims. (Cl. 51—280)

The invention relates to abrasive articles bonded with modified polymers of acrylic acid and substituted acrylic acid and their derivatives.

One object of the invention is to provide an abrasive article bonded with a harder resin of the class indicated. Another object of the invention is to provide an abrasive article bonded with a more heat resistant resin of the class indicated, preferably softening above 100° C. Another object of the invention is to provide a grinding wheel bonded with a synthetic resin, having some of the characteristics of shellac bonded grinding wheels. Another object of the invention is to provide a grinding wheel bonded with a synthetic resin having some of the characteristics of rubber. Another object of the invention is to provide a grinding wheel bonded with a synthetic resin having characteristics superior to either those of shellac or rubber for certain purposes and capable of substantial duplication in its physical properties. Another object of the invention is to provide a grinding wheel bonded with a synthetic resin having definite characteristics advantageous for the manufacture of grinding wheels.

Another object of the invention is to provide a grinding wheel bonded with a synthetic resin having one or more of the following characteristics: soft as compared with phenol-formaldehyde, readily controllable, resistant to heat as compared with shellac and rubber, and capable of being incorporated in a wide range of products. Another object of the invention is to provide a grinding wheel bonded with a resin capable of being made in different degrees of hardness for the manufacture of grinding wheels. Other objects will be in part obvious or in part pointed out hereinafter.

The invention accordingly consists in the combinations of elements, arrangements of parts, and in the several steps and relation and order of each of said steps to one or more of the others thereof, all as will be illustratively described herein, and the scope of the application of which will be indicated in the following claims.

It is known that the esters of acrylic acids and substituted acrylic acids polymerize to form transparent solids having many useful properties. For the manufacture of abrasive articles, however, the low softening points of these materials may be a disadvantage.

We copolymerize a monohydric alcohol ester of acrylic or alpha substituted acrylic acid with the allyl ester of one of these acids, with or without the addition of acrylic or alpha substituted acrylic acid and/or a polyhydric alcohol ester of acrylic or alpha substituted acid. In the various embodiments of the invention claimed herein, there is some allyl ester of acrylic or alpha substituted acrylic acid. As examples of the polyhydric alcohols, we may cite ethylene glycol, diethylene glycol, triethylene glycol, glycerol, pentaglycerol, trimethylene glycol, pentaerythritol, and mannitol.

In preparing the allyl ester of acrylic or alpha substituted acrylic acid, we may employ customary methods of esterification, such as direct esterification of the acid and alcohol with or without a catalyst, alcoholysis; the reaction of the acrylic or alpha substituted acrylic acid chloride with an alcohol or its metallic derivative, or the reaction of the acid anhydride and an alcohol with or without the addition of an organic base such as pyridine. It is usually preferable to include an inhibitor, such as pyrogallol, to prevent polymerization, but this must be removed before the ester can be polymerized or used for cross-linking. The polyhydric alcohol esters, if any such are used, may be made by these same methods.

*Example I*

Ethylene glycol dimethacrylate was prepared as follows: Twelve and four-tenths grams (0.2 mol) of ethylene glycol and eighty grams (0.80 mol) methyl methacrylate were mixed, and ten drops of concentrated sulphuric acid were added. To this solution was added one-tenth gram pyrogallol. The mixture was placed in a flask with a condenser attached and heated to 90° C. for twenty-four hours. During this period methyl alcohol distills out and gives a rough indication of the progress of the reaction. When all of the methyl alcohol has distilled over, the temperature is raised and the excess methyl methacrylate is distilled off. Before the methyl methacrylate is distilled off, it is advisable to shake the product with aqueous sodium carbonate solution to eliminate the sulphuric acid that was added as catalyst. Since some of the pyrogallol is removed by this treatment, it is desirable to add some excess before distilling to avoid polymerization. The residue from this distillation is taken up in ether and shaken with dilute sodium hydroxide. After the elimination of the pyrogallol by the treatment with aqueous sodium hydroxide, the ether solution is dried with calcium chloride and the ether is removed by suction.

The impure viscous ester thus obtained is suitable for use with methyl methacrylate as a cross-linking agent. The pure ester may be prepared by vacuum distillation of this product.

This method outlined above is generally applicable to the preparation of the methacrylates of the polyhydric alcohols that are not insoluble in methyl methacrylate.

In the preparation of these cross-linking agents, it has not been necessary for us to completely purify them, but three have been obtained in a high state of purity and their boiling points are given in the following table which specifies the vapor pressure under which the boiling point was determined.

| Compound | Temperature | Pressure |
| --- | --- | --- |
|  | Degrees | Millimeters |
| Ethylene glycol dimethacrylate | 83 to 85 | 5 |
| Pentaglycerol trimethacrylate | 170 | 1 |
| Trimethylene glycol trimethacrylate | 130 | 6 |

*Example II*

Methyl methacrylate containing twenty per cent allyl methacrylate and one-hundredth per cent benzoyl peroxide was heated at 60° C. for twenty-four hours. The temperature was then raised to 110° C. for a period of twelve hours. This can be done in a mold for the manufacture of any desired article. The product is a transparent glass-like solid and has a softening point higher than that of unmodified polymeric methyl methacrylate.

*Example III*

Methyl methacrylate containing fifteen per cent allyl methacrylate and fifteen per cent ethylene glycol dimethacrylate together with one-hundredth per cent benzoyl peroxide is heated at 60° C. for twenty-four hours. The temperature is then raised to 110° C. for twelve hours. The product is a glass-like solid with a softening point much higher than that of unmodified polymeric methyl methacrylate.

*Example IV*

Methyl methacrylate containing fifteen per cent allyl methacrylate and twenty per cent methacrylate acid and one-hundredth per cent benzoyl peroxide is heated at 60° C. for twenty-four hours. The temperature is then raised to 110° C. for twelve hours. The product is a stronger, more heat resistant resin than polymeric methyl methacrylate.

*Example V*

Methyl methacrylate containing ten per cent allyl methacrylate and ten per cent ethylene glycol dimethacrylate and fifteen per cent methacrylic acid together with one-hundredth per cent benzoyl peroxide is heated at 60° C. for twenty-four hours. The temperature is then raised to 110° C. for twelve hours. The product is very hard and heat resistant.

According to the invention, these resins are employed in the manufacture of grinding wheels and other abrasive products. Abrasive grain consisting of any of the varieties of alumina including fused alumina, emery and corundum, or silicon carbide or diamond bort or other suitable abrasive substances such as garnet, quartz, and any of the hard carbides may be formed into an abrasive product such as a grinding wheel, regulating wheel, lapping wheel or segment for any of these by bonding with these resins. Grinding wheels possessing some of the characteristics of those bonded with rubber and shellac may be produced according to the present invention, using any of the resins given in the preceding Examples II to V inclusive. We will now give specific examples for the manufacture of grinding wheels.

*Example VI*

We mix sixteen hundred and fifty-six grams of suitable abrasive with three hundred and sixty-five cubic centimeters of monomeric methyl methacrylate, one hundred and twenty-five cubic centimeters of monomeric allyl methacrylate, and ten cubic centimeters of methyl methacrylate containing one per cent benzoyl peroxide catalyst. The mixture is placed in an aluminum mold consisting of a cylindrical dish having slightly tapering sides and a tightly fitting aluminum cover. An aluminum core of suitable dimensions is placed in the center. Placing the cover upon the mold, we place the mold in an oven and heat to 60° C. for twenty-four hours. We then give the wheel a further baking for a period of ten hours at 110° C. Either before or after the final baking above specified, we strip the wheel from the mold. We then face and true the wheel. The wheel so produced is satisfactory for dry snagging whereas a similar wheel made from methyl methacrylate alone softens and smears on the face and does not cut freely.

*Example VII*

Proceeding as specified in Example VI so far as the various steps including the heat and use of the mold are concerned, we may make a grinding wheel with sixteen hundred and fifty-six grams of suitable abrasive and the following bond mixture: three hundred and thirty cubic centimeters of methyl methacrylate, one hundred cubic centimeters of allyl methacrylate, fifty cubic centimeters of ethylene glycol dimethacrylate, and twenty cubic centimeters of methyl methacrylate containing one per cent benzoyl peroxide catalyst. This wheel is harder and more heat resistant than that in Example VI.

For the manufacture of grinding wheels, we may prefer under some circumstances to produce first a powdered polymer. The powder may be made by grinding the massive polymer, or as follows: to one hundred and fifty cubic centimeters of allyl methacrylate and four hundred and fifty cubic centimeters of methyl methacrylate are added six-tenths gram of benzoyl peroxide. This mixture is then added to fourteen hundred cubic centimeters of carbon tetrachloride in which it is completely miscible and placed in a constant temperature bath at 65° C. After an induction period of about five hours the copolymer, being insoluble in the carbon tetrachloride, begins to precipitate as a fine powder and is filtered off, washed with carbon tetrachloride and dried.

Taking sixteen hundred and fifty-six grams of abrasive grain, we mix in five hundred grams of the above described powder and place in a hot press. We press the mixture for thirty minutes at a temperature of approximately one hundred and fifty degrees centigrade, then strip from the mold. The wheel is then complete, the heat and pressure having softened and coalesced the resin so that it forms with the abrasive grain an integral piece.

When it is desired to make a wheel with a high bond content, it sometimes becomes desirable to wet the abrasive grain with a suitable liquid before adding the powdered bond. Such a liquid may be a viscous solution of polymeric in monomeric methyl methacrylate.

Proceeding as heretofore outlined in Example VIII, we may make a powder from methyl methacrylate, allyl methacrylate and one of the esters containing more than one polymerizable unsaturated group per molecule or similar mixtures as heretofore pointed out.

In the examples given, we have used only the esters of methacrylic acid. It is to be understood, however, that the esters of the other alpha substituted acrylic acids, such as alpha phenyl acrylic, alpha ethyl acrylic or alpha chloro acrylic acids may be used within the scope of this invention. Also, whereas the methyl ester of methacrylic acid is most commonly referred to, other monohydric alcohol esters, such as isopropyl, isobutyl or phenyl esters could equally well have been used.

While we have described the production of grinding wheels made from abrasive grains and resin alone, it is to be understood that we may also incorporate a wide variety of fillers. In case, the resin is polymerized in situ, the filler must not contain inhibitors that will prevent the polymerization.

The present application is directed to abrasive articles. The novel method of making grinding wheels herein disclosed together with the new novel resins are claimed in separate copending applications Serial Nos. 187,549 and 187,548 filed on January 28, 1938.

It will thus be seen that there has been provided by this invention a composition of matter and article of manufacture in which the various objects hereinabove set forth together with many thoroughly practical advantages are successfully achieved. As many possible embodiments may be made of the above invention and as many changes might be made in the embodiment above set forth, it is to be understood that all matter hereinbefore set forth is to be interpreted as illustrative and not in a limiting sense.

We claim:

1. An abrasive body comprising abrasive grains bonded with methyl methacrylate copolymerized with allyl methacrylate.

2. An abrasive body comprising abrasive grains bonded with methyl methacrylate copolymerized with allyl methacrylate and ethylene glycol dimethacrylate.

3. An abrasive body comprising abrasive grains bonded with methyl methacrylate copolymerized with allyl methacrylate and methacrylic acid.

4. An abrasive body comprising abrasive grains bonded with methyl methacrylate copolymerized with allyl methacrylate, ethylene glycol dimethacrylate and methacrylic acid.

5. As an article of manufacture, an abrasive body comprising abrasive grains bonded with a copolymer comprising an allyl ester of an acid selected from the group consisting of acrylic acid and its alpha substitution products, and a different ester of a monohydric alcohol and an acid selected from the aforesaid group.

6. As an article of manufacture, an abrasive body comprising abrasive grains bonded with a copolymer comprising an allyl ester of an acid selected from the group consisting of acrylic acid and its alpha substitution products, a different ester of a monohydric alcohol and an acid selected from the aforesaid group, and an ester of a polyhydric alcohol and an acid selected from the aforesaid group.

SAMUEL S. KISTLER.
CARL E. BARNES.